Feb. 2, 1932.                H. LANGE                1,843,394
                              HOSE COUPLING
                    Filed Sept. 14, 1931    2 Sheets-Sheet 1

Inventor
Harald Lange,
By Shepherd & Campbell
Attorneys

Feb. 2, 1932.   H. LANGE   1,843,394
HOSE COUPLING
Filed Sept. 14, 1931   2 Sheets-Sheet 2

Inventor
Harald Lange,
By Shepherd Campbell
Attorneys

Patented Feb. 2, 1932

1,843,394

UNITED STATES PATENT OFFICE

HARALD LANGE, OF PORTLAND, OREGON

HOSE COUPLING

Application filed September 14, 1931. Serial No. 562,784.

This application is a continuation in part of my copending application Serial No. 391,367, filed September 9, 1929.

The object of the invention is to provide an improved hose coupling of simple and economical construction, and one which will be easier to manipulate than the hose couplings commonly employed.

A further object of the invention is to provide a hose coupling which, while being connectible and disconnectible with a single movement of the hand, is so constructed that the parts will not be accidentally separated as the hose is dragged about and subjected to twisting and other strains.

It is a further object of the invention to provide a quick detachable hose coupling comprising a female member adapted to be quickly and easily attached to the conventional faucet, and a male member adapted to be readily attached to the conventional femal coupling commonly found upon garden hose when the latter is purchased.

It is a further object of the invention to provide an extremely simple and economical type of lock to effect the locking of the parts against accidental separation.

Further objects and advantages of the invention will be set forth in the detailed description which follows:

In the accompanying drawings

Like numerals designate corresponding parts in all the figures of the drawings.

Figure 1:
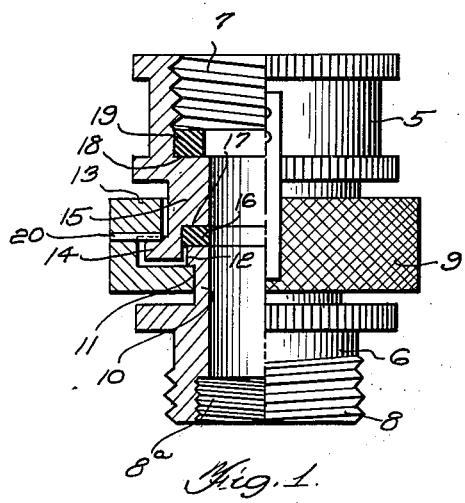
Figure 1 is a view partly in side elevation and partly in section of a hose coulping embodying the invention.
Figure 2:
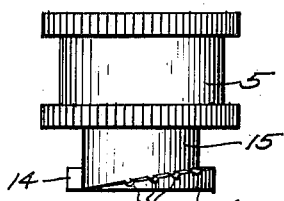
Fig. 2 is a side elevation of the female member hereinafter described.

In this description, the terms male and female have been used with relation to the capacity of the elements described, to engage the parts to which they are to be attached, such for example, as a faucet on one hand and a hose upon the other.

The coupling of the present invention comprises a female unit 5 and a male unit 6. The female unit 5 is provided with internal hose threads 7 adapted to be screwed upon a conventional type of faucet in place of a garden hose connection. The male unit 6 is provided with external hose threads 8 adapted to receive the usual female connection of a garden hose. The element is also provided with internal pipe threads 8a to adapt it to be screwed upon a pipe so that through the medium of this connection a hose may be connected to a metal pipe. The elements 5 and 6 are adapted to be connected through the medium of a ring 9. This ring is preferably externally knurled for convenience of manipulation. The member 6 is provided with a neck extension 10 which passes through an opening 11 of the ring and is provided with an outturned shoulder 12 within said ring, so that the ring and male member 6 are held against separation. The ring is of cup-like formation and is provided at spaced points about its free edge with inwardly directed lugs 13.

Cam segments 14 are formed upon a neck extension 15 of the female member and are adapted to engage beneath the lugs 13. A washer 16 bears between the inner end of the neck extension 10 and a shoulder 17 formed upon the female member 5 and the action of the cams 14 is such as to forcibly compress this washer. The female member is provided with an additional washer seat 18 for the reception of a washer 19 by which a fluid tight joint may be effected between the female member 5 and the faucet upon which it is screwed.

One of the important features of the present invention resides in the provision of locking means between the confronting faces of the cams 14 and the lugs 13.

Figure 3:
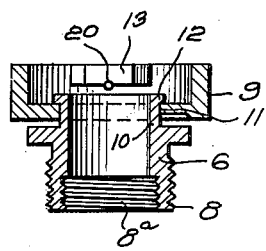
Fig. 3 is a sectional view thorugh the male member hereinafter described.
Figure 4:
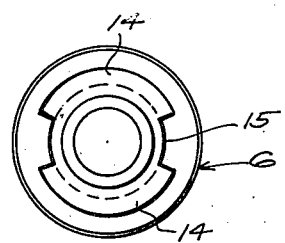
Fig. 4 is an end view of the structure of Fig. 2.
Figure 5:
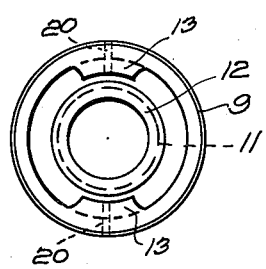
Fig. 5 is a plan view of the structure of Fig. 3.
Figure 6:
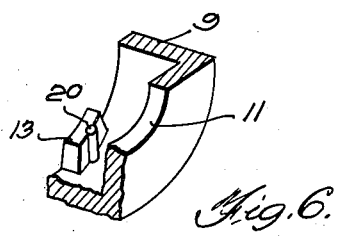
Fig. 6 is a detail perspective view showing a locking pin hereinafter described.
Figure 7:
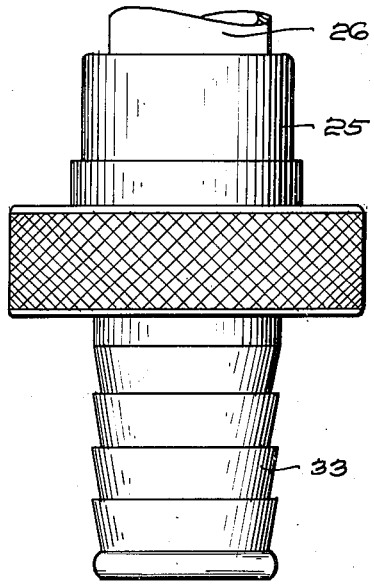
Fig. 7 is a side elevation of a modified form of assembly.
Figure 8:
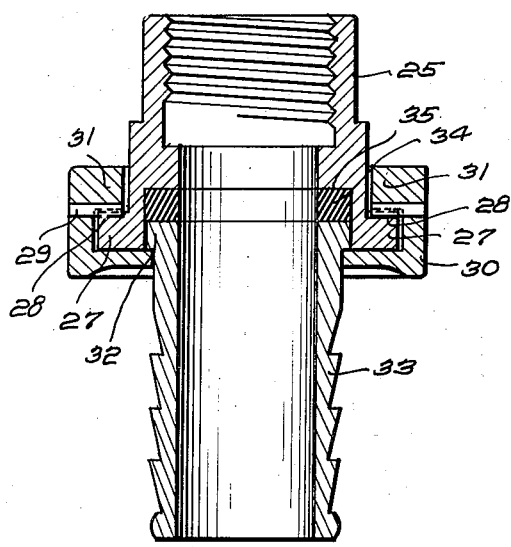
Fig. 8 is a sectional view through the structure of Fig. 7.
Figure 9:
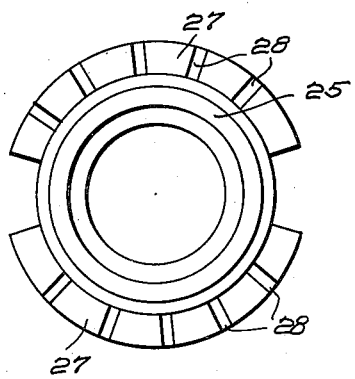
Fig. 9 is a plan view of the cam carrying member of Fig. 7.
Figure 10:
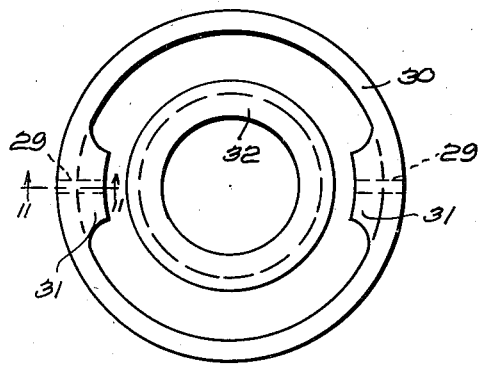
Fig. 10 is a plan view of the lug carrying member of Fig. 7.
Figure 11:
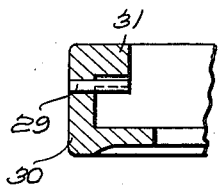
Fig. 11 is a sectional view upon line 11—11 of Fig. 10.

It is the usual practice to make couplings of this nature of brass, or other alloys of non-corrosive metals that are more or less soft. To provide a simple and inexpensive lock which will not easily wear away, I insert one or more pins 20 of hard metal, such as steel or the like, in such position that substantially one-half of the pin is embedded in the face of the adjacent lug 13, see Figs. 3, 5 and 6. I may use this locking pin in conjunction with only one of the lugs or I may use such a pin in conjunction with each of the lugs. The pin, while projecting substantially only half its diameter beyond the face of the lug, is backed up by said lug, but there is sufficient clearance between the pin and the lug to give a slight spring or yielding action to the pin so that when the ring 9 is turned, the pin will snap successively into the notches 14a formed in one or both of the cams 14 and thus accidental reverse movement of the parts will be effectually guarded against.

It has been found that under the twisting action to which garden hose is subjected in use, there is a possibility of the accidental disengagement of the cams and lugs, and the locking mechanism constituted by the pin 20 and notches 14a will effectually prevent such accidental disengagement.

Very little if any spring action of the pin is necessary, because the rubber washer 16 affords some yieldability between the parts, but these washers become more or less hard in use, and I find that the existence of some slight yield to the pin renders the device easier of manipulation and insures that if wear of the washers cause the pin to engage loosely in one of the notches 14a, the members may be turned a sufficient distance to effectually engage such pin in the next of said notches.

In the form of invention illustrated in Figs. 7 to 11, the same principles are employed. While the female member 25 is adapted to engage with a pipe 26 or other suitably threaded member, the connection between the parts 25 and 26 may be substantially like the connection between the parts 5 in Fig. 1 and the conventional type of faucet. The element 25 is provided with a pair of arcuate cams 27 having notches 28 formed in their faces which are adapted to be engaged by a hard metal pin 29 carried by a cup-like ring 30. This ring is provided with lugs 31 which are adapted to ride over the cams 27 when the ring is turned; the pin snapping into the notches 28 and said ring-like member serving to force the inner end 32 of a tubular hose connecting element 33 forcibly against a washer 34 that is disposed in a recess 35 of the member 25.

It is apparent that this arrangement will prevent accidental reverse movement of the parts in the same manner that the corresponding parts function in Figs. 1, 3, 5 and 6.

While the elements shown and described are well adapted to serve the purposes for which they are intended, it is to be understood that the invention is not limited to the precise construction set forth, but that it includes within its purview whatever changes fairly come within either the terms or the spirit of the appended claims.

Having described my invention, what I claim is:

1. A device of the character described comprising a pair of elements, a washer therebetween and a turnable ring, lugs carried by said ring and cams carried by one of said members having notches in their working faces, and a pin of a material harder than the material of said lugs radially disposed with respect to the ring and carried by the ring and embedded in the face of one of the lugs with a portion only of its diameter projecting beyond the face of said lug as and for the purposes set forth.

2. A device of the character described comprising a pair of elements, a washer therebetween and a turnable ring, integral inturned lugs carried by said ring and cams carried by one of said elements having notches in their working faces, and a pin of a material harder than the material of said lugs substantially radially disposed with respect to the ring and carried by the ring and embedded in the face of one of the lugs with a portion only of its diameter projecting beyond the face of said lug, the location of the pin being such, with respect to the lug, as to impart a limited degree of yieldability to the pin.

In testimony whereof I affix my signature.

HARALD LANGE.